United States Patent [19]
Abildtrup

[11] 3,892,840
[45] July 1, 1975

[54] METHOD OF PRODUCING AN OXYGEN CONTAINING SILICON COMPOUND

[75] Inventor: Jorgen Abildtrup, Augustenborg, Denmark

[73] Assignee: Danfoss A/S, Nordberg, Denmark

[22] Filed: Jan. 10, 1974

[21] Appl. No.: 432,197

Related U.S. Application Data

[63] Continuation of Ser. No. 208,914, Dec. 16, 1971, abandoned, which is a continuation of Ser. No. 43,144, June 3, 1970, abandoned.

[52] U.S. Cl. ..................... 423/325; 106/44; 106/55
[51] Int. Cl. ....................... C01b 21/06; C01b 33/00
[58] Field of Search ............ 106/55, 73.5; 423/325, 423/385

[56] References Cited
UNITED STATES PATENTS

| | | | |
|---|---|---|---|
| 2,968,530 | 1/1961 | Forgeng et al. | 423/325 |
| 3,356,513 | 12/1967 | Washburn | 423/385 |

*Primary Examiner*—J. Poer

[57] ABSTRACT

The invention relates to a method for producing an oxygen containing silicon compound free of silicon dioxide. This is accomplished by keeping the partial pressure of the oxygen at the reaction temperature lower than $10^{-16}$ atmospheres. In one embodiment the atmosphere consists of nitrogen and a small amount of oxygen in some form such as carbon monoxide. In other embodiments nitrogen may be replaced by hydrogen or an inert gas.

2 Claims, No Drawings

METHOD OF PRODUCING AN OXYGEN CONTAINING SILICON COMPOUND

This application is a continuation of application Ser. No. 208,914, filed Dec. 16, 1971, which in turn was a continuation of application Ser. No. 43,144, filed June 3, 1970, both now abandoned.

The invention relates to a method for producing an oxygen containing silicon compound free from $SiO_2$, in which method the initial material consists at least partly of silicon and is held at an appropriate reaction temperature in an atmosphere containing oxygen and at least one further component; the invention also relates to a shaped element produced by this method.

In producing oxygen containing silicon compounds, there arises the problem of the formation of $SiO_2$ instead of or in addition to the required oxygen containing silicon compound. It is well known that $SiO_2$ is extremely stable, but it interferes with the properties required in the material intended to be produced.

A typical example of this is the production of a silicon oxynitride ($Si_2ON_2$), which is used for binding the previously prepared grains of alpha-silicon carbide, for the manufacture of shaped elements for use in the refractory lining of furnaces, for electric resistors, etc. Even small proportions of $SiO_2$ in the $Si_2ON_2$ cause embrittlement of the shaped elements.

This undesirable formation of $SiO_2$ is encountered for example in a known method in which pure silicon powder is heated to the required reaction temperature in an atmosphere consisting half and half of oxygen and nitrogen. Attempts have also been made to bring about a reinforced formation of the required $Si_2ON_2$ by the addition of catalyst materials, e.g. calcium cyanamide. This, however, only results in reduced formation of $SiO_2$ in individual zones, so that there is obtained an element which lacks homogeneity in a manner that cannot be controlled.

The object of the invention is so to produce an oxygen-containing silicon compound from commercially pure silicon in an atmosphere containing free or combined oxygen, that the formation of $SiO_2$ can be avoided in a simple manner and a thoroughly homogeneous material results.

According to the invention, this object is achieved by keeping the partial pressure of the oxygen at the reaction temperature extremely low, and at least lower than $10^{-16}$ atmos.

Surprisingly, it has been found that extremely low partial oxygen pressures suffice for producing the required oxygen-containing silicon compound, but the formation of $SiO_2$ is thereby prevented. The permissible upper limit to the partial oxygen pressure depends upon the reaction temperature necessary for forming the required silicon compound. As the reaction temperature is reduced, the permissible partial oxygen pressure also diminishes. On the other hand, the required reaction slows down as the partial oxygen pressure is decreased; it is terefore desirable to operate in the zone of the upper permissible value.

If the method of the invention is applied to the production of silicon oxynitride in which silicon is heated in an atmosphere containing oxygen and nitrogen, the reaction temperature should be between 1200°C and 1600°C, and preferably between 1400°C and 1500°C, and the partial oxygen pressure at the upper limit should be lower than $10^{-17}$ atmos., and lower than $10^{-19}$ atmos., in the preferred range, while said pressure should be less than $10^{-23}$ atmos., at the lower limit. If the process is carried out in the preferred range near the upper value of the permissible partial oxygen pressure, extremely short reaction times in the order of 1–3 hours are achieved. In this connection, the partial oxygen pressure should be greater than $10^{-26}$ atmos., in order not to slow down the reaction too much.

In a first embodiment, the atmosphere consists of nitrogen with a small proportion of oxygen. In this embodiment and the embodiments described below however, port of the nitrogen can be replaced by hydrogen or an inert gas.

It is particularly advantageous if the atmosphere consists of nitrogen and carbon monoxide. Then, at the same reaction temperature at which $Si_2ON_2$ is formed, there is also formed SiC, the oxygen of the CO contributing to the formation of the first-named compound and the carbon of the CO helping to form the second-mentioned compound. Of particular interest in this connection is the fact that the silicon carbide is present in the beta form, which has a considerably lower electrical conductivity than the normal alpha - silicon carbide produced at temperatures of approximately 2100°C. The reaction takes place in accordance with the formula:

It is therefore possible, in one operation, not only to produce silicon carbide, but also the associated binding agent. There is therefore obtained a homogeneous element of mixed materials having very desirable properties. In particular, o shaped element of this kind can be used as an electrical heating resistor of relatively high capacity which can be directly connected to a 110 or 220 V mains supply.

To alter, and particularly to increase, the conductivity of the element so produced, it is desirable to increase the SiC content. This can be readily achieved by raising the partial pressure of the CO, combining the excess oxygen by forming gaseous SiO, and passing this into cooler zones of the furnace. This procedure can be described by means of the following formula:

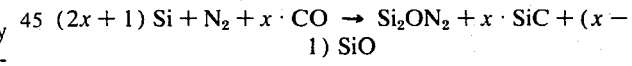

In this way more carbon is made available for forming the beta-silicon carbide. The greater proportion of oxygen cannot have a disturbing effect since, at the temperatures obtaining during the reaction, the excess combines with the silicon present to form the gas SiO and then automatically passes into the cooler zones of the furnace, where separation takes place in accordance with the formula:

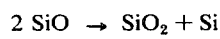

It is also possible to use, as the initial material, not pure silicon powder but a mixture of silicon and previously prepared alpha-silicon carbide. This silicon carbide can then either be combined with pure silicon oxynitride or with a mixture of silicon oxynitride and beta-silicon carbide.

It has been found expedient to carry out the reaction firstly at 1420°C and then at 1500°C. A thorough reaction is achieved in a short while in this manner even when the particle sizes of the silicon powder are relatively great.

The individual steps of the method may be as follows: the silicon powder which is optionally mixed with alpha-silicon carbide powder, is mixed with a binding agent and is pressed in a mould after water has been added; the pressing is dried, and is heated to a reaction temperature in an atmosphere of pure nitrogen, after which small quantities of free oxygen or combined oxygen as, for example, CO are added to the nitrogen during a period of 1 – 3 hours, and finally the pressing is cooled to room temperature in an atmosphere of pure nitrogen.

By means of the method of the invention, it is possible to produce a shaped element consisting of pure beta-silicon carbide and silicon-oxynitride. An element of this kind possesses extremely high strength and resistance to heat, and, in addition, a very low electrical resistance. It is therefore eminently suitable for use in the production of refractory linings or electrical resistors which can be directly connected to the mains supply.

The element may also contain alpha-silicon carbide if it is required to possess certain properties.

By adding alpha-silicon carbide there is obtained a lower conductivity and also a lower mechanical stability which, however, suffices for the majority of industrial requirements.

EXAMPLE 1

The initial material used was a commercially pure silicon powder having a particle-size and particle-size distribution in accordance with FEPA Standard F 320/29, or finer. Approximately 3% of dextrin was added to this powder as the binding agent. The time for mixing 1 kg of the composition in a rotating drum was 3 hours. Water was then added to this raw substance until a degree of moistness necessary for the ensuing pressing operation was reached. A shaped element was then pressed in a tungsten carbide tool. The pressure was applied on two sides and was in the order of approximately 2500 kp/cm$^2$. In this example, the dimensions of the element were 4 × 4 × 60 mm. Two shaped element was then dried for about 20 hours in a drying cupboard having a temperature of 200°C and fitted with an air-circulation system.

The dried shaped element was treated in its following manner in a tubular continuous furnace. First, it was heated to 1420°C in an atmosphere of pure nitrogen at a warm-up rate of 600°C/h. Carbon monoxide was then added to the nitrogen atmosphere. The element was kept for 1-3 hours in this mixed atmosphere. It was then cooled to room temperature in an atmosphere of pure nitrogen at a rate of approximately 600°C/h.

In a first test, 3 cm$^3$ of CO and 30 cm$^3$ of N$_2$ per minute were added during the reaction period. This resulted in a very high beta-silicon carbide content. At 20°C, the element had an electrical resistance of 700 Ohm. In a second test, 1 cm$^3$ of CO and 30 cm$^3$ of N$_2$ per minute were introduced into the furnace. This resulted in less beta-silicon carbide being produced. Although having the same dimensions, the element possessed an electrical resistance of 7000 Ohm at 20°C.

In further tests it was found that by varying the CO content, changes in resistance over three powers of ten can be obtained.

EXAMPLE 2

The test as in Example 1 was repeated but using an initial material consisting of 95% of alpha-silicon carbide powder and 15% of commercially pure silicon powder. This resulted in a shaped element having similar properties but a considerably greater electrical resistance.

Other ceramic materials, e.g. MoSi$_2$, can be formed with the help of Si$_2$ON$_2$.

I claim:

1. A method of producing shaped elements of silicon oxynitride essentially free of SiO$_2$, which comprises forming a silica-free powder compact consisting essentially of powdered silicon and heating the compact at a temperature in the range 1200°C to 1600°C and under a gaseous atmosphere consisting essentially of nitrogen and free oxygen, for a period of from 1-3 hours, where the gaseous atmosphere contains an amount of free oxygen gas sufficient to maintain the partial pressure of oxygen in the reaction zone during the reaction period lower than 10$^{-16}$ atmospheres but greater than 10$^{-26}$ atmospheres.

2. A method according to claim 1, wherein the compact is heated at a temperature in the range 1400°C to 1500°C in a gaseous atmosphere consisting essentially of nitrogen and free oxygen, wherein the partial pressure of said free oxygen is below 10$^{-19}$ atmospheres but greater than 10$^{-26}$ atmospheres.

* * * * *